United States Patent

Hundhausen

[15] 3,648,594
[45] Mar. 14, 1972

[54] BARBECUE

[72] Inventor: Eckhard Hundhausen, Betzdorf am Sieg, Germany

[73] Assignee: Wolfe-Gerate GmbH, Betzdorf am Sieg, Germany

[22] Filed: Jan. 20, 1970

[21] Appl. No.: 4,364

[30] Foreign Application Priority Data

Jan. 21, 1969 Germany......................P 19 02 870.7

[52] U.S. Cl.................................................99/331, 99/447
[51] Int. Cl........................................................A47j 37/04
[58] Field of Search..................................99/331, 324–325,
99/326–327, 328–329, 332–333, 334–335,
389–390, 391–392, 393, 401, 407, 447

[56] References Cited

UNITED STATES PATENTS

| 1,491,570 | 4/1924 | Thornblade.......................99/401 UX |
| 1,862,733 | 6/1932 | Wright...................................99/332 R |
| 2,594,528 | 4/1952 | White...........................99/329 R UX |
| 2,598,808 | 6/1952 | Ledin................................99/331 UX |

*Primary Examiner*—Edward L. Roberts
*Assistant Examiner*—Arthur O. Henderson
*Attorney*—Ostrolenk, Faber, Gerb & Soffen

[57] ABSTRACT

A barbecue is provided with a temperature-responsive element which controls the position of a heat screen and thus the cooking temperature.

19 Claims, 5 Drawing Figures

Patented March 14, 1972
3,648,594
2 Sheets-Sheet 1
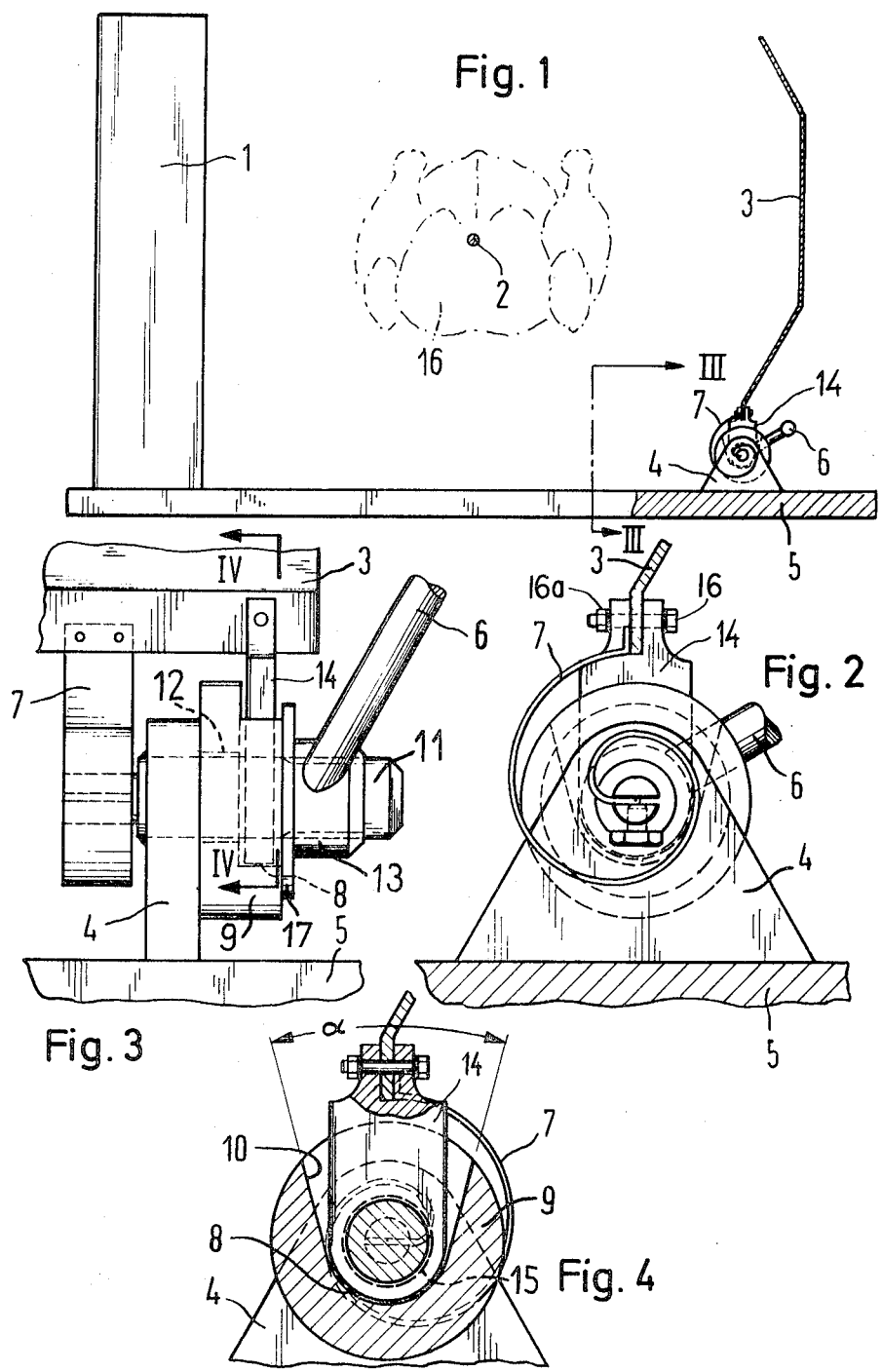

Patented March 14, 1972

Inventor:
ECKHARD HUNDHAUSEN
BY
Ostrolenk Faber Gerb & Soffen
ATTORNEYS

BARBECUE

BACKGROUND OF INVENTION

1. Field of invention

The present invention relates to barbecues and more particularly to charcoal barbecues in which the space provided for the article of food to be barbecued is delimited by at least one screen part (for example, in the form of a cover, hood or reflector) to reduce heat losses.

In the barbecuing of some types of meat, the meat is first given a preparatory roasting on its surface and then the meat is cooked at a high even ambient temperature.

SUMMARY OF INVENTION

The present invention consists in a barbecue comprising a frame, means for supporting an article of food to be barbecued, heat screen means, and temperature-responsive means for setting the position of the screen means in accordance with a desired cooking temperature of the article of food.

In accordance with one embodiment of the invention the barbecue comprises a cover with an opening arranged to be closed and opened by the screen means which is in the form of a closing flap, and heat-responsive means comprising a bimetallic element connected with the cover and the flap. A handle can be fixed on the cover and can have the temperature-regulating means arranged adjacent to it. The bimetallic element can be in the form of a spiral, one end of which is connected with an extension on the handle while the other end is fixed to a central part of the flap.

In order to regulate the action of the bimetallic strip a threaded pin, a nut, and a spring-biasing member are provided, which cooperate together as a spring-biasing means serving for to apply an adjustable spring loading force on the flap for regulating the action of the bimetallic element, the threaded pin engaging the central part of the flap. The spring may be a helical compression spring arranged between a top part of the handle and the nut.

In accordance with a further embodiment of the invention the barbecue comprises a reflector arranged to reflect heat toward the article of food, a reflector base, means connecting the reflector with the reflector base and for setting the reflector in various coarse adjustment positions in relation to the base, and a bimetallic strip, serving as the temperature-responsive means, for producing relative angular movement between the reflector and the base for varying the amount of heat reflected on to the article of food in accordance with the temperature.

BRIEF DESCRIPTION OF DRAWINGS

Embodiments of the invention will now be described with reference to the accompanying drawings.

FIG. 1 shows a charcoal barbecue device in accordance with the invention with a heat screen constructed in the form of a reflector.

FIG. 2 is a side view, on a greater scale than that of FIG. 1 of a holding arrangement for the reflector.

FIG. 3 shows, also on a greater scale, a view of the holding arrangement of FIG. 1, looking in the direction of arrows III—III.

FIG. 4 is a section along the line IV—IV of FIG. 3.

DESCRIPTION OF PREFERRED EMBODIMENTS

Figure 5:
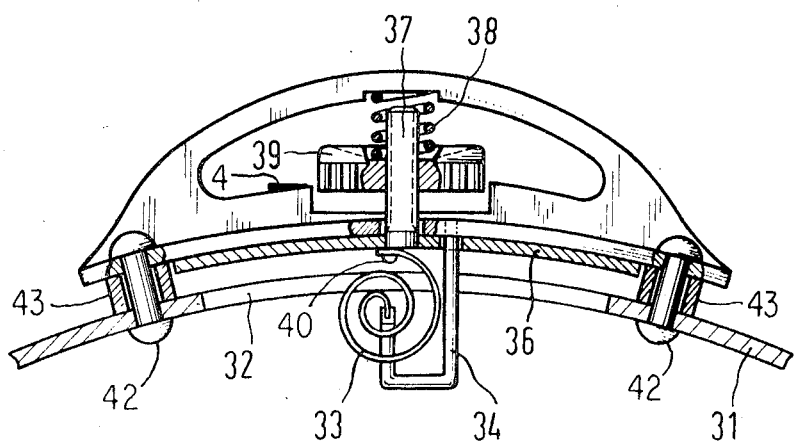
FIG. 5 shows a further embodiment of a screen part in the form of a cover assembly, partially sectionalized, of which only the bottom part is shown.

Referring now to the drawings and more particularly to FIG. 1 it can be seen that this figure represents a so-called "upright barbecue," the heat source in the form of a charcoal container 1 being arranged on the baseplate 5. On the opposite end of the baseplate 5 a solid or imperforate reflector 3 is provided. Between the container 1 and the reflector 3 the barbecue spit 2 is arranged in a conventional manner with the article of food 16 to be cooked being mounted upon the spit.

The reflector 3 is carried by means of a pivot bearing 4 on the base or baseplate 5 so that the reflector can swing as will be explained below.

The details of the attachment of the reflector 3 will be found in FIGS. 2 to 4. Bearing 4 is attached to the base 5 and is provided with an opening in which a bearing pin 11 is arranged. The bearing pin 11 extends outwardly from both sides of the bearing 4. The lower edge of the reflector 3 is fixed in a forked arm 14, which, in turn, is pivotally mounted on the bearing 4 in a manner which will be described below. Furthermore, on the one end of the pin 11 (the left hand end in FIG. 3) extending out of the bearing 4, the inner end of a spiral bimetallic strip 7 is attached by means of screw 15; the outer end of the bimetallic strip 7 is attached to the lower edge portion of the reflector 3 by fastening means 16–16a and can move the latter through an arcuate part in accordance with the temperature level within the barbecue.

Near to the bottom end of the forked arm 14 the latter is provided with an opening 15 in order to receive the bearing pin 11. Before the arm is placed on the bearing pin 11 the holder 9 is placed on the pin. The holder has a central hole 12 for receiving pin 11. The holder 9 can be swung by hand into various angular positions and clamped in anyone of them by means of a clamping device 13 in the form of a part with a female screw thread which is screwed on the end of the bearing pin 11. The clamping device 13 thus presses the holder 9 firmly against the bearing 4. The large annular disc 17 or washer provided on the clamping device 13 ensures that there is a large pressing face on the holder 9 without the angular movement of the forked arm 14 being impaired.

The holder 9 has a recess or socket 10 for receiving the forked arm 14 and allowing it to move. This socket or recess 10 allows a pivoting movement of the forked arm 14 about an angle $\alpha$. The lower part of the socket 10 is semicircular and so forms a low-friction bearing 8 for the lower end of the forked arm 14, which is also semicircular. This bearing 8 must off a very low resistance to movement of the reflector 3 since the latter and the forked arm 14 are only moved by the bimetallic strip 7 for fine adjustment.

A lever or handle 6 is attached to the clamping device 13 for bringing about coarse setting of the reflector 3. For this purpose the clamping device 13 is loosened so that the pressure of the disc 17 against the bearing 9 is decreased to such an extent that manual adjustment into the desired angular position becomes possible. After this coarse setting of the reflector has been made, the fine setting is carried out automatically in accordance with the temperature at a position adjacent to the article of food to be cooked owing to the bimetallic strip 7, which — as already mentioned — can change the position of the reflector through an angular range of $\alpha$. The higher the temperature at a position adjacent to the article of food to be cooked — and thus also at a position adjacent to the bimetallic strip — the further the reflector 3 is rotated away from the source of heat. This rotational movement occurs in the opposite direction when the temperature decreases.

It is pointed out that the device in accordance with the invention can also be applied to a so-called horizontal barbecue. In this case the reflector 3, whose fine angular adjustment is controlled by the bimetallic strip, also holds back convection currents so as to bring about a further heating effect.

It is also to be noted that the reflector 3 is highly polished on its side turned towards the article of food to be barbecued; for example, the reflector can be made of electropolished stainless steel.

The holding arrangement for the reflector shown in FIGS. 2 to 4 can, for example, be also provided in the center of the lower edge of the reflector 3. It is also possible to provide such a holding arrangement at both ends of the lower edge of the reflector 3. Finally it is also possible to provide the arrangement as shown in FIG. 3 at only one end of the reflector 3 while at the opposite end a different bearing device is provided.

It is pointed out that it is also possible to journal the forked arm 14 on the bearing pin 11 instead of been supported by the interior face of the socket 10.

FIG. 5 shows the top part of a screen in accordance with the invention in the form of a cover 31. In a handle on the cover 31, which may for example be in the form of a semispherical structure, the automatic temperature regulating device is arranged. The cover 31 can, for example, be constructed of glass.

On the upper side of the cover 31 an opening 32 is provided through which a spirally shaped bimetallic strip 33 extends into the interior of the cover. The bimetallic strip 33 has its inner end attached to a hook-shaped part 34 forming an extension on the handle.

The outer end of the bimetallic strip 33 is attached to the underside of a flap 36, for example, by means of a pin 40. The flap serves for steplessly opening and closing the opening 32.

The flap 36 has an opening for the passage of the extension 34 and in its central part is provided with an upwardly projecting guide bolt or pin 37. The guide pin 37 passes through a guide opening in the handle and its upper end is provided with a thread. The guide pin 37 guides movement of the flap 36 as the latter is moved between its closed and open position. On the thread of the guide pin 37 a temperature setting nut 39 is provided which has a knurled edge. The temperature setting nut 39 carries a temperature scale (not shown) which cooperates with an index mark 41, shown in the drawing on the left of the knurled nut. On the upper side of the temperature setting screw 39 there is a helical compression spring 38 whose upper end fits in a recess in the upper part of the handle. This helical spring 38 urges the flap 36 in the closing direction against the action of the bimetallic strip 33. By twisting the temperature setting nut 39 it is possible to regulate the force exerted by the spring 38 on the flap 36 and thus select the desired temperature.

In the embodiment of the invention shown in FIG. 5 the handle is attached to the cover or hood 31 by a number of rivets 42, and a corresponding number of space pieces 43 in order to allow for the movement of the flap upwards and downwards.

The bimetallic strip 33 provided inside the cover exerts a force on the flap 36 in accordance with the temperature obtaining in the barbecue; when the bimetallic strip 33 exerts a greater force on the flap 36 than the helical spring 38 mounted on the pin 37 the flap is moved upwards so as to increase the size of the annular gap between the flap and the cover 31, so that the hot air can escape.

The invention is not restricted to open-air barbecues of the type chiefly used in barbecue parties and can be applied to kitchen types of equipment and generally to all types of roasting, grilling and smoking devices.

I claim:

1. A barbecue comprising a frame, means for supporting an article of food to be barbecued, adjustably mounted reflector means, and temperature-responsive means for adjusting the position of the reflector means relative to the food support in response to the changes in the grilling temperature.

2. A barbecue in accordance with claim 1 comprising a cover with an opening arranged to be closed and opened by the screen means which is in the form of a closing flap.

3. A barbecue in accordance with claim 2 in which the heat-responsive means is a bimetallic element connected with the cover and the flap.

4. A barbecue in accordance with claim 3 comprising a handle fixed on the cover, the temperature-regulating means being arranged adjacent to the handle on the cover.

5. A barbecue in accordance with claim 4 in which the bimetallic element is in the form of a spiral with two ends, the one end being connected with an extension on the handle while its other end is fixed to a central part of the flap.

6. A barbecue in accordance with claim 5 comprising a threaded pin, a nut, and a spring which cooperate together as a spring-biassing means serving for applying an adjustable spring loading force on the flap for regulating the action of the bimetallic element, the threaded pin engaging the central part of the flap.

7. A barbecue in accordance with claim 6 in which the spring is a helical compression spring arranged between a top part of the handle and the nut.

8. A barbecue in accordance with claim 1 comprising a reflector arranged to reflect heat on to the article of food, base member, means connecting the reflector with the reflector base and for setting the reflector in various coarse adjustment positions in relation to the base, and a bimetallic strip, serving as the temperature-responsive means, for producing relative angular movement between the reflector and the base for varying the amount of heat reflected on to the article of food in accordance with the temperature.

9. A barbecue in accordance with claim 8 in which the bimetallic strip is spiral in shape and has an inner and an outer end, the inner end being connected with the base member, and the outer end being connected with a lower edge of the reflector.

10. A barbecue in accordance with claim 9 wherein said base member is provided with a pivot bearing having a bearing pin mounted within said bearing, a holder, pivotally mounted on said pin and arranged to be clamped against the bearing for setting the coarse adjustment positions of the reflector in relation to the bearing; the reflector having a rotatable member for supporting the reflector mounted within said holder and on said pin being capable of being rotated in relation to the bearing in accordance with fine temperature adjustment effected by the bimetallic strip.

11. A barbecue in accordance with claim 10 wherein said pin is substantially horizontally aligned and journaled in the bearing, for connecting the holder with said bearing, and locking means for the holder in various angular positions in relation to the bearing.

12. A barbecue in accordance with claim 11 comprising a female threaded part screwed on a threaded end of the pin for pressing the holder against the bearing.

13. A barbecue in accordance with claim 12 wherein said rotatable member comprises an arm having a forked end attached to a lower edge portion of the reflector, the opposite end of the arm receiving said pin serving for carrying the reflector on the bearing.

14. A barbecue in accordance with claim 8 in which the forked arm near its bottom is journaled on the bearing pin.

15. A barbecue in accordance with claim 14 in which the forked arm supporting the reflector is provided with a semicircular convey lower end face which fits in a socket provided in the holder.

16. A barbecue in accordance with claim 15 in which the bearing pin passes through the bearing and on the side remote from the holder is connected with the inner end of the bimetallic strip.

17. A barbecue in accordance with claim 10 in which first and second rotatable holders and bimetallic strips are provided at two horizontally spaced positions along said reflector.

18. A device in accordance with claim 10 in which the fine and coarse setting means are provided at one corner of the reflector, while at the other corner of the reflector is rotatably supported by free-wheeling bearing means.

19. A device in accordance with claim 13 in which the forked arm is journaled on the bearing pin for rotational movement in accordance with the fine setting of said bimetallic strip.

* * * * *